Oct. 12, 1954 N. BASHARK 2,691,537
FLARELESS TUBE FITTING
Filed June 3, 1949 2 Sheets-Sheet 1
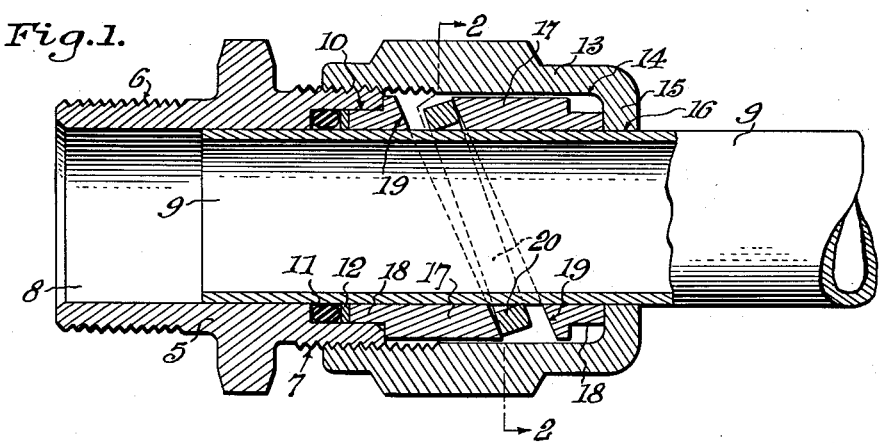
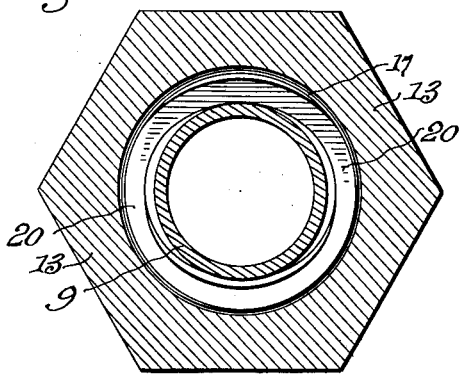
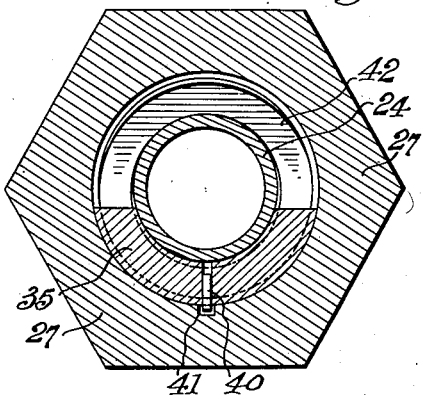
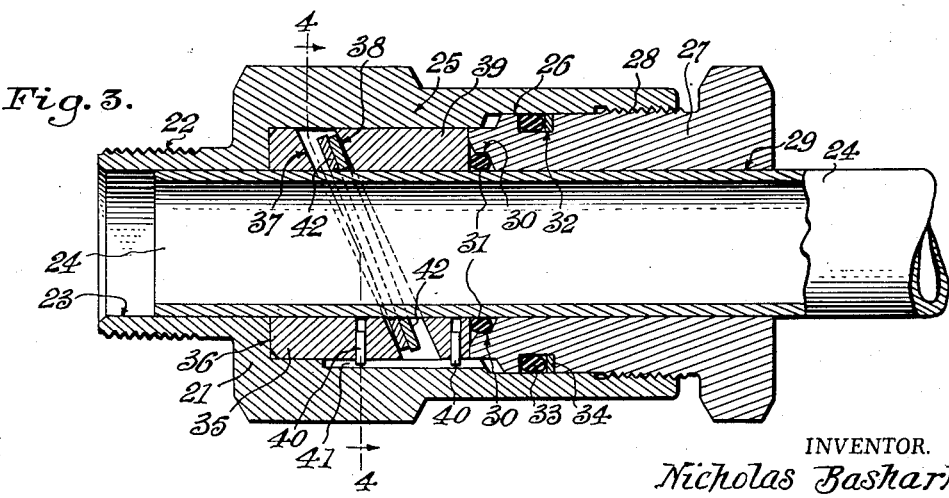
INVENTOR.
Nicholas Bashark.
BY
Mason, Porter, Diller & Stewart
ATTORNEYS Oct. 12, 1954 N. BASHARK 2,691,537
FLARELESS TUBE FITTING
Filed June 3, 1949 2 Sheets-Sheet 2

INVENTOR.
Nicholas Bashark.
BY
Mason, Porter, Diller & Stewart
ATTORNEYS

UNITED STATES PATENT OFFICE 2,691,537

FLARELESS TUBE FITTING

Nicholas Bashark, Dayton, Ohio, assignor to The Parker Appliance Company, Cleveland, Ohio, a corporation Application June 3, 1949, Serial No. 97,004

5 Claims. (Cl. 285—122)

The invention relates generally to tube fitting or coupling structures in which to secure and seal a plain end tube, that is a tube devoid of flare, groove, bead or the like at the end portion thereof which is to be secured, and it primarily seeks to provide an improved structure of the character stated which is simple in design and subject to being manufactured economically, and which is so constructed as to be capable of efficiently sealing the tube or tubes inserted therein and of positively resisting pull out strains even when assembled at relatively low wrench torque application.

An object of the invention is to provide a fitting of the character stated in which a tube may be sealed and secured without the necessity of placing or forcing the end thereof against a seat or shoulder, and in which the securing of the tube is accomplished in a manner for avoiding the scraping of metal along the tube.

Another object of the invention is to provide a fitting of the character stated in which the securing of the tube is accomplished by canted ring means encircling the tube within the fitting and caused to be canted on and in biting engagement with the tube by reason of endwise pressure application on said ring means exerted by cam surfaces brought against the ring means incidental to low torque assembly of the housing components of the fitting.

Another object of the invention is to provide a fitting structure of the character stated wherein the canted ring means are so arranged within the fitting that pull strains tending to withdraw a tube endwise from the fitting act to accentuate the canting of the ring means and the tight gripping of the tube thereby.

Another object of the invention is to provide a fitting of the character stated in which the tube securing canted ring engages the tube in line contact at opposite sides only and not about the whole circumference of the tube, thereby providing for a proper securing of the tube with a lower wrench torque application than would otherwise be possible.

Another object of the invention is to provide a fitting of the character stated in which the tube securing ring means is caused to assume the canted tube gripping position by contact between two opposing, reversely bevelled annuli at least one of which is formed on a sleeve slidable along the tube incidental to the assembly of the housing components of the fitting.

Another object of the invention is to provide a fitting of the character stated in which the ring canting reversely bevelled annuli are formed on two sleeves which may slidably engage the tube during initial assembly of the fitting and which are identical in construction so as to be interchangeable.

Another object of the invention is to provide a fitting of the character stated in which the ring canting sleeves and housing parts are equipped with cooperating pin and slot means effective to hold the reversely bevelled sleeves in proper alignment.

With the above and other objects in view that will hereinafter appear, the nature of the invention will be more clearly understood by reference to the following detailed description, the appended claims and the several views illustrated in the accompanying drawings.

In the drawings:

Figure 1 is a longitudinal sectional view illustrating a tube fitting structure embodying the invention.

Figure 2 is a vertical cross section taken on the line 2—2 on Figure 1.

Figure 3 is a view similar to Figure 1 illustrating another form of tube fitting embodying the invention.

Figure 4 is a vertical cross section taken on the line 4—4 on Figure 3.

Figure 5:
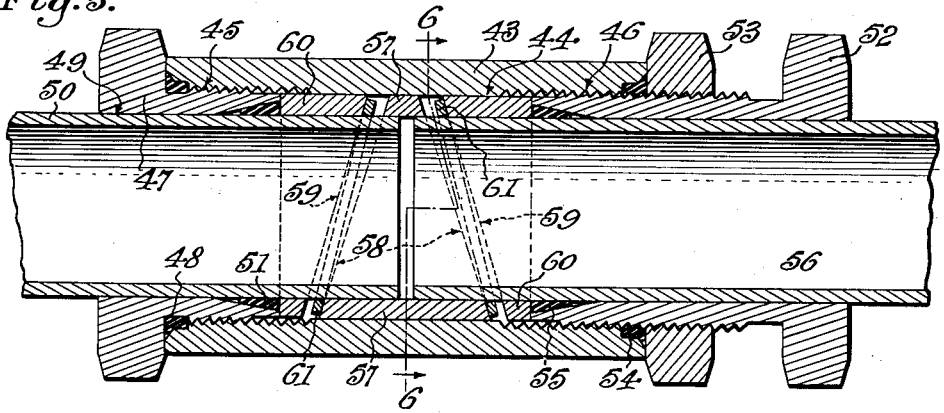
Figure 5 is a longitudinal sectional view illustrating a union type of tube connection embodying the invention.

In Figures 1 and 2 there is illustrated a form of the invention in which there is included a body or nipple 5 which is externally threaded as at 6 for mounting purposes, and as at 7 for threadably receiving the nut which cooperates with said nipple or body in forming the housing structure. The nipple is bored as at 8 to receive a tube 9, and is counterbored as at 10 to receive a tube sealing O ring 11 and an anti-extrusion follower ring 12.

The nut 13 which is internally threaded so as to be threadable on the externally threaded portion 7 of the nipple as in Figure 1 has a center clearance or chamber 14 and an inwardly turned shoulder or end portion 15 which is bored as at 16 to receive the tube 9.

Two opposed cam sleeves 17 surround the tube within the chamber 14 formed in the nut 13, and each said sleeve is equipped with a reduced end portion 18, one said end portion being disposed to fit into the nipple or body counterbore 10 against the follower ring 12, and the other of said reduced end portions being disposed for engagement with the inwardly turned nut shoulder 15. Each sleeve 17 has an angle cut end portion or bevelled cam surface 19, and it will be apparent that said cam surfaces are opposed in parallel spaced relation in the manner clearly illustrated in Figure 1. A continuous grip ring 20 encircles the tube between the opposing bevelled cam surfaces 19 of the cam sleeves 17. The inside diameter of this ring is such that it is freely slidable on the tube except when it is canted in the manner illustrated in Figure 1 by contact between the opposing bevelled cam surfaces 19 of the sleeves 17. When the ring is so canted the opposite inner edges of said ring will engage in line contact at opposite sides of the tube and bite into the latter in a manner for firmly securing the same in the fitting.

During the assembly of the fitting illustrated in Figure 1, the nut 13 and the sleeves 17 with the ring 20 between them are slid onto the end of the tube 9 which is to be secured and sealed in the fitting, and then the end of said tube is inserted through the counterbore 10 of the nipple into the bore 8 thereof in the manner illustrated in Figure 1. It is unnecessary to place the end of the tube against any limiting shoulder, or in fact to provide any accuracy of placement of said tube end in the nipple. After the tube has been inserted the packing and packing rings 11 and 12 may be inserted in the nipple counterbore 10, after which the adjacent cam sleeve 17 may be slid along the tube so as to insert its reduced end portion 18 into said nipple counterbore. By now moving the nut 13 and the other sleeve 17 and the ring 20 along the tube, the nut can be threadably engaged with the externally threaded portion 7 of the nipple. The sleeves 17 are self-aligning, and as the nut is threaded home on the nipple the opposing bevelled cam faces 19 of the sleeves 17 engage at opposite sides of the grip ring 20 in the manner illustrated in Figure 1 and cause said ring to assume a canted position within the nut chamber and between the sleeves 17, in which position the ring will bite into the outer surface of the tube in line contact at opposite sides only thereof, being free of contact at the remaining opposite sides in the manner clearly illustrated in Figure 2. Because of this manner of engagement of the ring at opposite sides only with the tube 9 the proper assembly of the fitting can be effected at low wrench torque application and yet a very efficient securing of the tube against pull-out strains will be assured.

The proportioning of the reduced end portion 18 of the sleeve disposed to extend into the nipple counterbore 10 is such as to bring about the desired amount of deformation of the sealing ring 11. Should it be desired to rely upon fluid pressure deformation of the ring in effecting the seal, the sleeve extension need not be extended far enough to deform the ring. It will also be apparent that the reducing of the end of the cam sleeve which is engaged by the inwardly turned nut shoulder reduces the amount of frictional contact between said shoulder and said sleeve and contributes toward the feature of providing assembly and tube securing grip contact with a minimum of wrench torque application. While any acceptable form of packing may be employed it is preferred that the sealing ring 11 be an O ring deformed in the receiving counterbore in a manner for assuring proper sealing of the tube. The follower ring 12 fits closely in the counterbore 10 and about the tube so as to prevent extrusion of the rubber of the sealing ring.

In the form of the invention illustrated in Figures 3 and 4 it will be noted that multiple canted grip rings are employed, and that said rings and the cam surfaces which effect the canting of said rings are mounted in a chamber formed wholly within the nipple or body, the nut being somewhat in the nature of a gland nut which is threaded into, instead of about, the open end of the nipple or body.

In this form of the invention the nipple or body 21 is externally threaded as at 22 for mounting purposes, and is bored as at 23 to receive the tube 24. The nipple or body is counterbored as at 25 to receive the cam sleeves and the grip rings as previously stated, and is counterbored as at 26 to provide a chamber in which to receive the nut 27 which is threaded into the open end of the nipple or body as at 28. The nut is bored as at 29 to receive the tube 24.

It will be observed that the nut 27 is counterbored as at 30 to receive the sealing ring 31 which preferably takes the form of an O ring The nut also is provided with an annular recess 32 in which to receive a sealing ring 33 which is backed up by a follower ring 34 which snugly fits within the recess in a manner for preventing extrusion of the sealing ring. In this case also the sealing ring preferably takes the form of an O ring.

Within the chamber formed in the nipple or body 21 endwise of the threadably mounted nut 27 there is mounted a cam sleeve 35 which abuts the abutment wall or counterbore bottom 36 of the nipple, and said sleeve is provided with an angle cut or bevelled cam face 37 at its inner end which opposes a like cam face 38 on the cam sleeve 39 mounted in the other end of the body counterbore in position for being engaged by the inner end of the nut 27. The cam sleeves 35 and 39 have pins 40 projecting radially therefrom in position for engaging in a longitudinal slot or recess 41 formed in the nipple or body 21, and this pin and slot equipment serves to hold the opposing bevelled cam faces 37 and 38 of said sleeves in proper alignment or relation.

Multiple grip rings 42 surround the tube 24 between the opposing parallel cam faces 37 and 38 of the sleeves 35 and 39, and when the nut is threaded into the nipple or body said rings will be canted so as to cause opposite edge portions thereof to bite into and grip the external surface of the tube 24 at opposite sides only in the manner previously described, thereby to secure the tube within the fitting with a minimum of wrench torque application.

In this form of the fitting the nut 27, the sleeve 35 and 39 and the grip rings 42 between them may be slid along the tube 24 before the same is inserted into the nipple bore 23, or, if preferred, the cam sleeves and the grip rings may be first inserted in the nipple counterbore 25 before the tube end is inserted in the bore 23, the nut 27 and its sealing ring alone being slid along the tube 24 before said insertion. The canted rings, moved into their gripping position illustrated in Figure 3 by the movement of the sleeve 39 toward the sleeve 35 incidental to the threading home of the nut 27, serve to secure the tube within the fitting, and the sealing rings 31 and 33 seal the fitting against leakage about the tube and through the nut bore 29, and also about the tube and between the external surface of said nut and the internal surface of the nipple counterbore 26. The manner in which the canted rings engage in line contact at opposite sides only of the tube is clearly illustrated in Figure 4.

Figure 6:
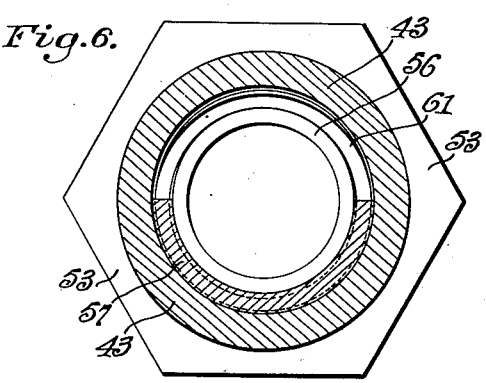
Figure 6 is a vertical cross section taken on the line 6—6 on Figure 5.

It will be readily apparent that in both forms of the invention illustrated in Figures 1 and 3, pull strains tending to pull the tubes out of the fittings will serve only to accentuate the canting of the grip rings and hence will serve to secure the tubes more tightly within the fittings. In Figures 5 and 6 of the drawings there is illustrated another form of the invention in which two tubes are secured within a fitting, this being a union type of connection. The fitting of Figures 5 and 6 includes a body 43 which is bored as at 44 to provide a center chamber, said body being internally threaded as at 45 at one end and as at 46 at its other end. A gland nut 47 is threaded into the internally threaded end 45 of the body and is sealed as at 48 with respect to said body end and bored as at 49 to receive one tube 50. The nut 47 also is equipped with a packing 51 surrounding the tube 50 in a manner for sealing the same.

Another gland nut 52 is threaded into the internally threaded end 46 of the body 43, and when so threaded may be secured in position by a jam nut 53. A packing 54 is provided between the jam nut 53, the nut 52 and the end of the body 43, and another packing 55 is provided about the other tube 56 which is inserted through a receiving bore in the gland nut 52.

It will be apparent by reference to Figure 5 that the ends of the tubes 50 and 56 lie adjacent one another in the central chamber provided by the body 43 and within a cam sleeve 57 which surrounds the ends of said tubes within the body chamber. The cam sleeve 57 is equipped at its opposite ends with oppositely bevelled cam surfaces 58 which oppose like angled or bevelled cam surfaces 59 provided at the inner ends of cam sleeves 60 which are interchangeably mounted within the ends of the body chamber closed by the inner ends of the gland nuts 47 and 52. A grip ring 61 surrounds each tube between each set of opposing angled or bevelled cam surfaces 58 and 59, and it will be apparent that as the relative movement of the parts is brought about by a threading of one or both of the gland nuts into the body 43, the opposing cam surfaces will cause the rings 61 to be canted and bite into opposite sides of the tube in line contact in the manner previously described. As in the previously described forms the canted rings are caused to grip the tube and secure the same against pull out strains with minimum wrench torque application, and the packing devices 55, 48 and 54 serve to seal the tube against leakage about the tube and through the gland nuts or about said tubes and between said gland nuts and the body. While any suitable packing means may be employed, it is preferred that the several packings take the form of O rings which are suitably deformed during the assembly of the parts.

Figure 8:
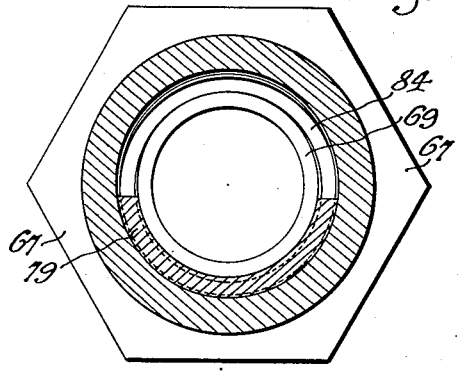
Figure 8 is a vertical cross section taken on the line 8—8 on Figure 7.
Figure 7:
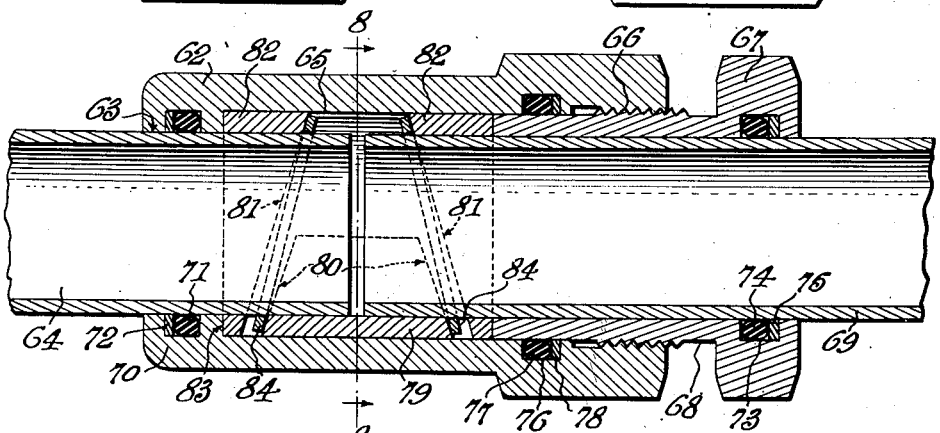
Figure 7 is a view similar to Figure 5 illustrating another form of union type connection embodying the invention.

In the form of the invention illustrated in Figures 7 and 8 the arrangement is comparable to that in Figure 5 except for differences in structure of the body and nut, the sealing means and the provision of a central cam sleeve which takes the form of a half-sleeve rather than a whole sleeve as in said Figure 5.

In this form of the invention the body 62 is bored as at 63 to receive one tube 64 and is counterbored as at 65 to provide a housing chamber which is internally threaded as at 66 to receive the gland nut 67. The gland nut is bored as at 68 to receive the other tube 69.

The body is annularly recessed as at 70 to receive a sealing ring 71 and an extrusion preventing backing ring 72, and the nut is similarly recessed at 73 to receive a sealing ring 74 and an extrusion preventing backing ring 75.

The body counterbore 65 also is annularly recessed as at 76 to receive a sealing ring 77 and an extrusion preventing backing ring 78.

Within the body housing or chamber provided by the counterbore 65 the adjacent ends of the tubes 64 and 69 are overlaid by a half-sleeve 79 which is equipped with angle cut or bevelled end portions or cam surfaces 80. The cam surfaces 80 are opposed by oppositely angled or bevelled cam end portions 81 formed on two interchangeably mounted cam sleeves 82, one of which fits against the base or end wall 83 of the counterbore 65 and the other of which is engaged by the inner end of the gland nut 67. Inwardly of each sleeve cam surface 81 and between it and the opposing cam surface 80 of the sleeve 79 a grip ring 84 encircles each tube end. It will be apparent that as the gland nut 67 is threaded into the body 62 it will move the cam sleeve 82 engageable thereby toward the other or cooperating cam sleeve, and the engagement of said rings at opposite sides between the cooperating cam surfaces 81, 81 and 80, 80 will cause the rings to be canted in the manner illustrated in Figure 7 with the result that they will engage in gripping line contact at opposite sides of the tube in the manner previously described and as clearly illustrated in Figure 8. This canting of the rings serves to secure the tubes 64 and 69 against pull-out strains and it will be apparent that when such strains are exerted they will tend to increase the canting of the rings and cause them to more firmly grip the tubes, as in the previously described forms of the invention. It will also be apparent that the sealing rings 71 and 74 will seal the fitting against leakage about the tubes, and the sealing ring 77 will seal the fitting against leakage between the gland nut 67 and the body 62.

It will be apparent from the foregoing that in all forms of the invention herein shown and described it is unnecessary to prepare the ends of the tubes to be secured in the fittings or unions. In other words, it is unnecessary to flare, groove, bead or otherwise preshape the tube ends prior to the mounting thereof in the fittings. It will also be apparent that the proper securing of the tubes in the fittings or unions can be effected with a minimum of wrench torque application. This manner of securing the tubes makes it unnecessary to seat the tubes against an abutment shoulder, or to accurately place said tube end within the fitting, and the particular manner of engagement of the retainer rings with the tube, without contact with movement limiting abutment shoulders, prevents the scraping of metal along the external surfaces of the tubes. It has also been explained that the canting of the rings between angled or bevelled cam surfaces provides a self-locking means which is effective upon the setting up of pull strains tending to pull tubes out of the fitting to increase the firm gripping of the rings against the external surface of the tube.

While several acceptable forms of the inven-

What I claim is:

1. A flareless tube fitting comprising threadably connected housing members bored to receive flareless tube ends and cooperatively shaped to provide an annular chamber surrounding adjacent ends of tubes projecting into the chamber from opposite ends thereof, a cam sleeve member at least partially surrounding the adjacent ends of the tube and having reversely bevelled end portions, a grip ring surrounding each tube endwise of each end of said cam sleeve member, and a cam sleeve endwise of each ring within said chamber and having a reversely bevelled end opposing the adjacent cam sleeve bevelled end portion and effective in cooperation with said cam sleeve member as the housing members are threaded together to cause the rings to assume canted positions about the tubes with inner edge portions thereof biting into and securing said tube against pull out strains.

2. A flareless tube fitting comprising threadably connected housing members bored to receive flareless tube ends and cooperatively shaped to provide an annular chamber surrounding adjacent ends of tubes projecting into the chamber from opposite ends thereof, a cam sleeve member at least partially surrounding the adjacent ends of the tubes and having reversely bevelled end portions, a grip ring surrounding each tube endwise of each end of said cam sleeve member, and a cam sleeve endwise of each ring within said chamber and having a reversely bevelled end opposing the adjacent cam sleeve bevelled end portion and effective in cooperation with said cam sleeve member as the housing members are threaded together to cause the rings to assume canted positions about the tubes with inner edge portions thereof biting into and securing said tubes against pull out strains, and means for sealing the fitting against egress of fluid between said tubes and the housing members.

3. A fitting structure as defined in claim 1 in which the housing members comprise a body and a gland nut each bored to receive a tube end, one of the cam sleeves engaging endwise with the body and the other with said nut, and the sealing means comprising a packing surrounding and engaging the tube within the body, a packing surrounding and engaging the tube within the nut, and a packing surrounding and engaging the nut within the body.

4. A fitting structure as defined in claim 1 in which the housing members comprise a body and a gland nut threaded into each end thereof and each bored to receive a tube end, one of the cam sleeves engaging endwise with each nut and there being included a jam nut for securing one gland nut in adjusted position, and the sealing means comprising a packing surrounding each tube in the inner end of the respective nut and held in place by the cam ring in the respective end of the chamber, a packing between one gland nut and the respective body end, and a packing between the other gland nut the respective body end and the jam nut.

5. A fitting structure as defined in claim 1 in which the housing members comprise a body and a gland nut each bored to receive a tube end, one of the cam sleeves engaging endwise with the body and the other with said nut.

References Cited in the file of this patent

UNITED STATES PATENTS

| Number | Name | Date |
|---|---|---|
| 1,903,926 | Lamont | Apr. 18, 1933 |
| 1,959,607 | Anderson | May 22, 1934 |
| 2,147,354 | Scholtes | Feb. 14, 1939 |
| 2,358,158 | Gibbert | Sept. 17, 1944 |
| 2,360,732 | Smith | Oct. 17, 1944 |
| 2,397,749 | Mendelson | Apr. 2, 1946 |
| 2,447,221 | Warring | Aug. 17, 1948 |
| 2,483,395 | Benson | Oct. 4, 1949 |
| 2,503,826 | Lamont | Apr. 11, 1950 |

FOREIGN PATENTS

| Number | Country | Date |
|---|---|---|
| 530,505 | Great Britain | Dec. 12, 1940 |